(12) United States Patent
Abrams (10) Patent No.: US 9,065,877 B2
(45) Date of Patent: Jun. 23, 2015

(54) LIVE CONCERT/EVENT VIDEO SYSTEM AND METHOD

(71) Applicant: Live Nation Worldwide, Inc., Beverly Hills, CA (US)

(72) Inventor: Michael D. Abrams, Los Angeles, CA (US)

(73) Assignee: Live Nation Worldwide, Inc., Beverly Hills, CA (US)

( * ) Notice: Subject to any disclaimer, the term of this patent is extended or adjusted under 35 U.S.C. 154(b) by 0 days.

(21) Appl. No.: 14/192,503

(22) Filed: Feb. 27, 2014

(65) Prior Publication Data

US 2014/0181272 A1 Jun. 26, 2014

Related U.S. Application Data

(60) Division of application No. 12/727,997, filed on Mar. 19, 2010, now Pat. No. 8,701,153, which is a continuation of application No. 10/988,375, filed on Nov. 12, 2004, now abandoned.

(51) Int. Cl.

| H04N 7/173 | (2011.01) |
| H04L 29/06 | (2006.01) |
| H04N 5/247 | (2006.01) |
| H04N 5/76 | (2006.01) |
| H04N 7/18 | (2006.01) |
| H04N 21/218 | (2011.01) |
| H04N 21/24 | (2011.01) |
| H04N 21/258 | (2011.01) |
| H04N 21/414 | (2011.01) |

(52) U.S. Cl.
CPC .......... *H04L 65/4092* (2013.01); *H04N 5/247* (2013.01); *H04N 5/76* (2013.01); *H04N 7/181* (2013.01); *H04N 21/21805* (2013.01); *H04N 21/2408* (2013.01); *H04N 21/25891* (2013.01); *H04N 21/41407* (2013.01)

(58) Field of Classification Search
CPC .................................................. H04N 7/17336
USPC .............................. 709/219; 725/91, 135, 141
See application file for complete search history.

(56) References Cited

U.S. PATENT DOCUMENTS

| 2003/0093797 A1* | 5/2003 | Bazzaz .......................... 725/74 |
| 2006/0174297 A1* | 8/2006 | Anderson et al. ............. 725/100 |

\* cited by examiner

*Primary Examiner* — Hunter B Lonsberry (74) *Attorney, Agent, or Firm* — Kilpatrick, Townsend & Stockton, LLP.

(57) ABSTRACT

One aspect of the invention is a method of providing video to attendees of a live concert. Video of different views of the live concert is captured. A plurality of video streams are provided to attendees of the live concert while the live concert is occurring. The plurality of digital video streams enable an attendee of the live concert to select which of the plurality of digital video streams to view using a portable digital device associated with that attendee such that the attendee may choose from among the different views of the live concert.

18 Claims, 3 Drawing Sheets

LIVE CONCERT/EVENT VIDEO SYSTEM AND METHOD

CROSS REFERENCE TO RELATED APPLICATIONS

This application is a divisional of U.S. application Ser. No. 12/727,997 filed Mar. 19, 2010, which is a continuation of U.S. application Ser. No. 10/988,375, filed Nov. 12, 2004. Each of these applications is hereby incorporated by reference in its entirety for all purposes.

TECHNICAL FIELD OF THE INVENTION

This invention relates generally to concerts or other live events and more particularly to a video system and method.

BACKGROUND OF THE INVENTION

At some live events including, for example concerts, video of the live event is presented on a screen to participants. This video often allows attendees of the live event to get a better view of the event as it is occurring than they would otherwise have. For example, if the attendee is far away from the stage where the live event is occurring, the video picture may provide a closer view than the attendee has from his or her seating location. Unfortunately, however, the choice of what content is displayed on the screen at such an event rests with the operator of the screen or persons controlling the event rather than with the viewer of the event.

SUMMARY OF THE INVENTION

One aspect of the invention is a method of providing video to attendees of a live concert. Video of different views of the live concert is captured. A plurality of video streams are provided to attendees of the live concert while the live concert is occurring. The plurality of digital video streams enable an attendee of the live concert to select which of the plurality of digital video streams to view using a portable digital device associated with that attendee such that the attendee may choose from among the different views of the live concert. The invention could be used for any live event.

The invention has several important technical advantages. Embodiments of the invention may have none, one, some, or all of these advantages without departing from the scope of the invention. The invention allows an attendee at a live event with a poor seating location to obtain a better view of the event. The invention may enrich the viewing experience of an attendee at a live event. By giving the attendee control over the particular video images that he or she views at a live event, the attendee may come away with a more favorable view of the event than if the attendee is merely presented with video chosen by the party putting on the event. The invention may also enhance the reputation of a party performing at the live event by enhancing an attendee's overall experience at the event.

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION OF THE INVENTION

Figure 1:
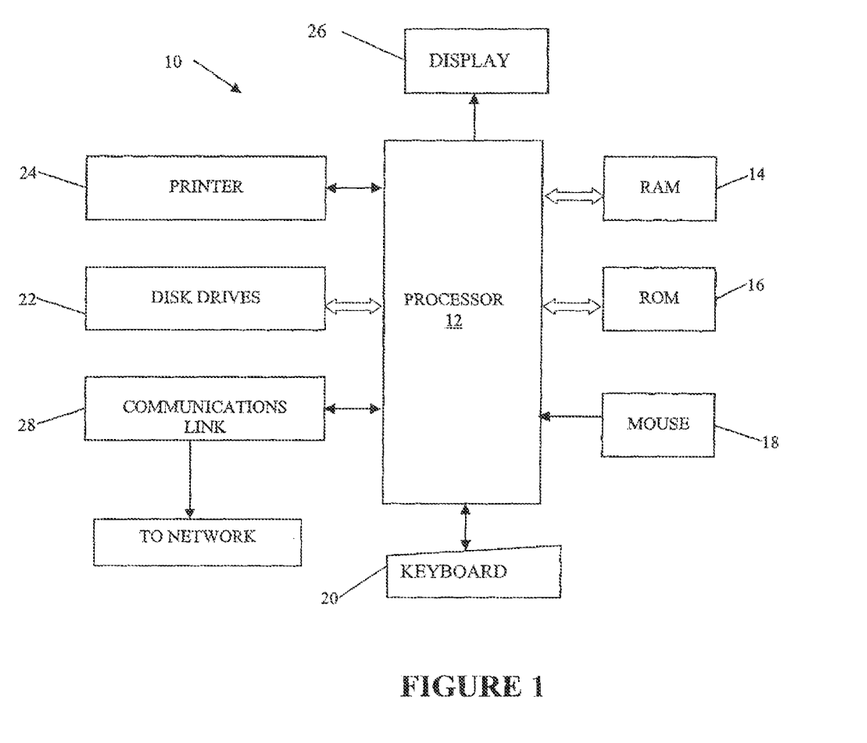
FIG. 1 illustrates a block diagram of a general purpose computer that may be used in accordance with the present invention.
Figure 2:
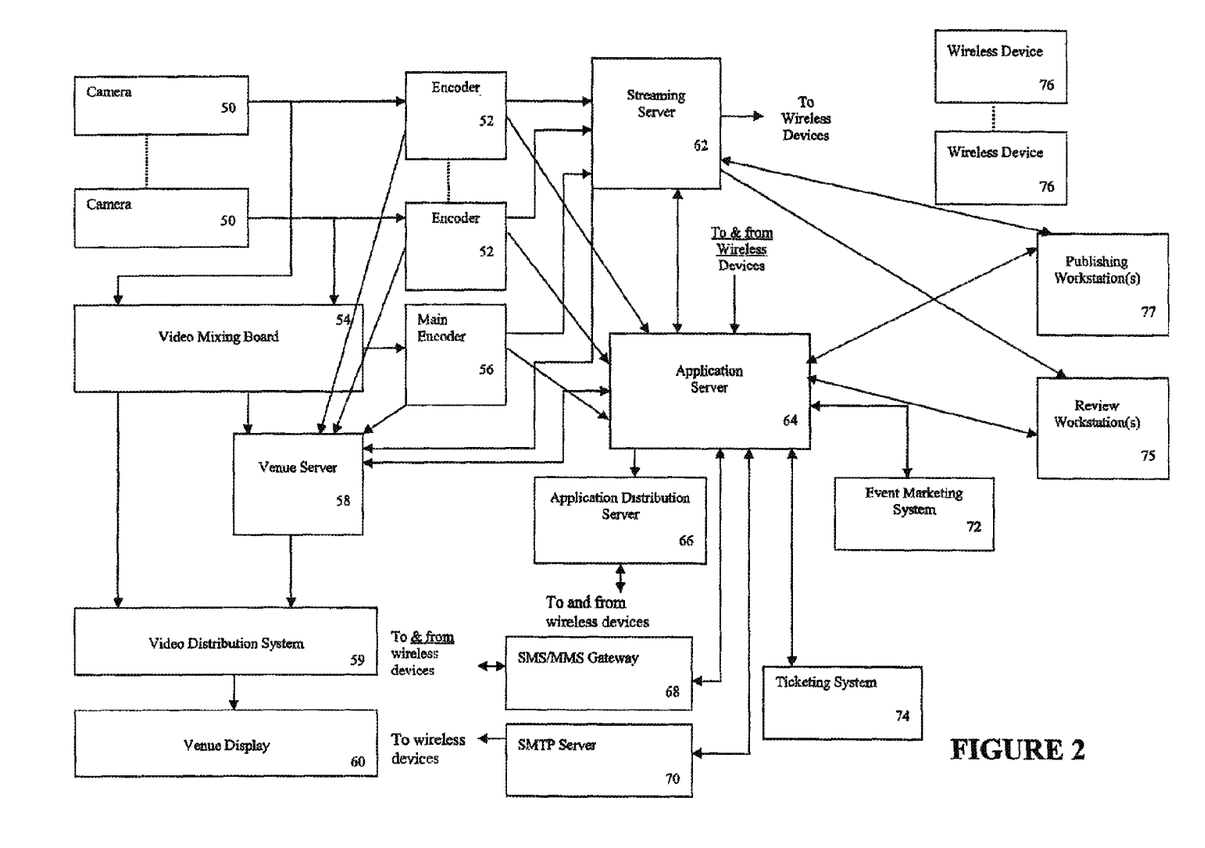
FIG. 2 illustrates an example architecture of a system that may be used to provide video of a live event in accordance with the present invention.
Figure 3:
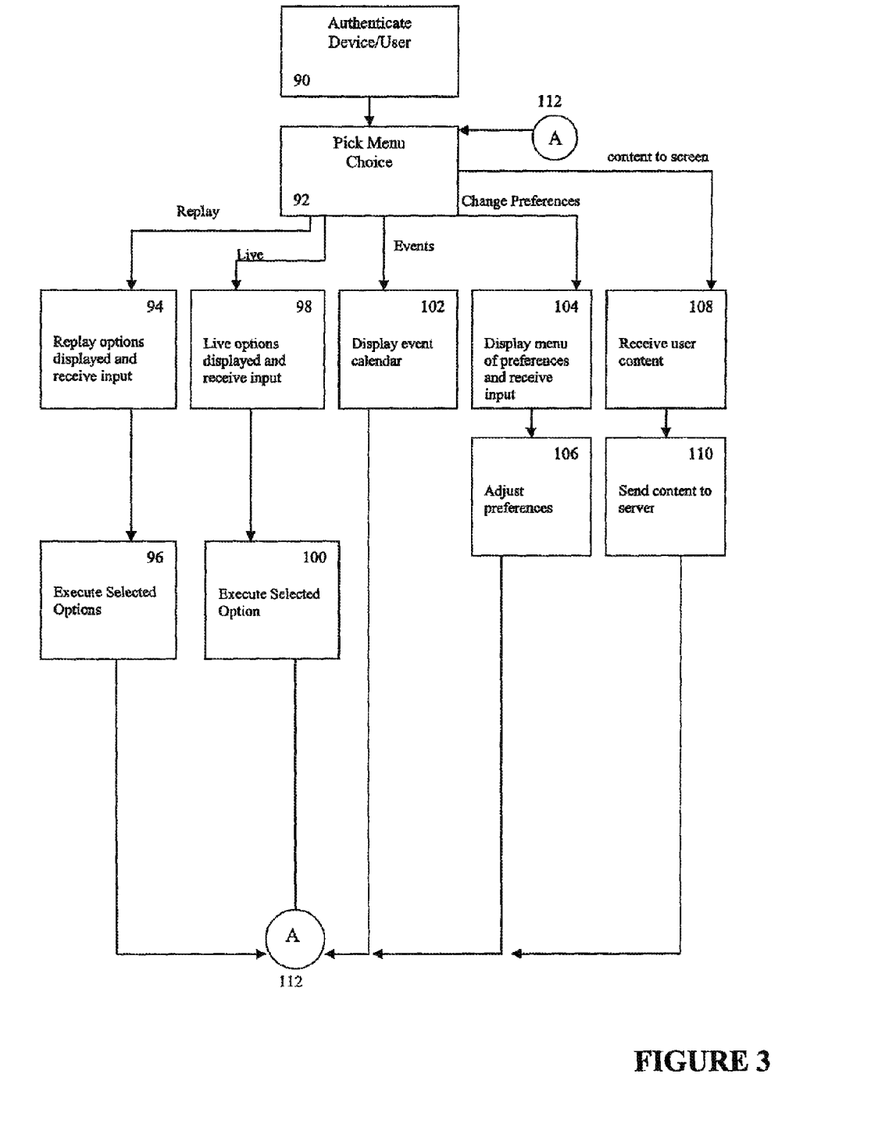
FIG. 3 illustrates a method of operating a portable digital device to obtain video of a live event in accordance with one embodiment of the present invention.

The preferred embodiment of the present invention and its advantages are best understood by referring to FIGS. 1 through 3 of the drawings, like numerals being used for like and corresponding parts of the various drawings.

FIG. 1 illustrates a general purpose computer 10 that may be used in connection with one or more of the pieces of software employed by the present invention. General purpose computer 10 may be adapted to execute any of the well-known OS2, Unix, Mac-OS, Linux, and Windows operating systems or other operating systems. General purpose computer 10 comprises processor 12, random access memory (RAM) 14, read-only memory (ROM) 16, mouse 18, keyboard 20 and input/output devices such as printer 24, disk drives 22, display 26 and communications link 28. The present invention may include programs that may be stored in RAM 14, ROM 16, removable storage, PRAM, NV-RAM, or disk drives 22 and may be executed by processor 12. Communications link 28 may be connected to a computer network but could be connected to a telephone line, an antenna, a gateway, a wireless local area or wide area network, or any other type of communication link. Disk drives 22 may include a variety of types of storage media such as, for example, floppy disk drives, hard disk drives, DVD-ROM drives, RAM disks, compact flash card, memory stick, CD ROM/RAM/RW or DVD ROM/RAM/RW drives or magnetic tape drives. Although this embodiment employs a plurality of disk drives 22, a single disk drive 22 could be used without departing from the scope of the invention. FIG. 1 provides one example of a computer that may be used with the invention. The invention could be used with computers other than general purpose computers as well as general purpose computers without conventional operating systems.

The invention includes logic contained with a medium. In this example, the logic comprises computer software executable on a general purpose computer. The media may include one or more storage devices associated with general purpose computer 10. The invention may be implemented with computer software, computer hardware, or a combination of software and hardware. The logic may also be embedded within any other medium without departing from the scope of the invention.

The invention may employ multiple general purpose computers 10 networked together in a computer network. Most commonly, general purpose computers 10 may be networked through the Internet, and/or in a client server network. The invention may also be used with a combination of separate computer networks each linked together by a private, virtual private, or public network.

FIG. 2 illustrates a block diagram of an architecture of one system comprising an embodiment of the present invention. The system comprises cameras 50, encoders 52, video mixing board 54, main encoder 56, venue server 58, venue display 60, streaming server 62, application server 64, application distribution server 66, SMS/MMS 30 gateway 68, SMTP server 70, event marketing system 72, ticketing system 74, review workstation 75, publishing workstation 77, video distribution system 59, and wireless devices 76. The function of each of these devices in the context of the invention will be discussed in more detail below. It should be noted that various embodiments of the invention will have more or less components without departing from the scope of the invention. The functions of the various devices illustrated in FIG. 2 may be combined such that the functions of multiple devices are performed by a single device. Alternatively, in other embodiments, functions performed by a single device in the system illustrated in FIG. 2 will be performed by multiple and/or redundant devices in alternative embodiments.

Among other functions that will discussed more fully herein, the system illustrated in FIG. 2 allows an attendee of a live event (or another person able to receive the required signals) to select one of a plurality of video streams of the live event. Each video stream may comprise a video signal received from a different camera which is creating video of the event from a different viewpoint. Thus, the invention allows the user to view the event from various perspectives and to select which perspective the viewer wishes to view the event from at a particular time period. The term video signal is meant to refer broadly to any analog or digital video representation. It is not limited to any particular type of video signal.

The invention can be used at various types of live events. Examples of live events at which the invention may be used include concerts, sporting events, speeches, plays, operas, dance shows, and the circus. However, the invention is not limited to use for these types of live events and could be used with any type of live event.

Below, the functions of the various components of the system illustrated in FIG. 2 are described in more detail. In addition to the ability of the system to provide user selected video of a live event as it is occurring, the system in FIG. 2 may also provide various other features which will also be described below.

The invention may be particularly useful at live concerts or live sporting events. In these types of events, attendees often scramble to buy tickets for the "best" locations from which to view the event. The invention may allow more attendees at such events to obtain "better" views of the event by viewing various videos of the event taken from "better" locations than the location from which the attendee's tickets allow him or her to view the event. This may increase the number of "good" tickets and may allow charging of a higher ticket price.

The system of FIG. 2 includes a plurality of cameras 50. Cameras 50 may be placed at various locations around a venue hosting a live event so as to provide multiple viewpoints from which an attendee can view video of the live event. Cameras 50 may provide far away views, medium views and/or close up views. Cameras 50 may be operated by a videographer, by remote control, or may capture video without a human controlling them. Cameras 50 may capture video in digital or analog form without departing from the scope of the invention. If video is captured in analog form, it may be converted to digital form inside cameras 50, in encoder 52, or using other hardware (not explicitly shown). Any number of cameras 50 may be used without departing from the scope of the invention. The cameras 50 may also, optionally, have the capability to take still photos of the live event as it is occurring. The still photos may be provided either to venue display 60 or to wireless devices 76 (or other devices) on a periodic basis (e.g. every ten seconds) or on a random basis. If cameras 50 do not have the built-in capability to take still photos, then a full frame (for example, comprised of one or two frames of interlaced video or one frame of progressive video) of video may be used to provide such a snapshot feature.

Simply because video is "captured" by cameras 50 does not mean that the captured video is recorded such that a copy of the live event is created. As further described below, in some embodiments, the captured video may be streamed to end users without recording the video. In such embodiments, video may only be captured for a period of time long enough to rebroadcast the video in accordance with the invention.

Encoders 52 may be used to translate an analog video signal into a digital video signal. Encoders 52 may also be used to translate a digital video signal in one particular format into a digital video signal of a different digital video format for supply to streaming server 62. In this embodiment, encoders 52 comprise a combination of hardware and computer software running on a general purpose computer 10. Encoders 52 could be, however, dedicated hardware or software running on a general purpose computer 10 without departing from the scope of the invention.

In this embodiment, there is one encoder 52 for each camera 50. Each encoder 52 receives a video signal from camera 50 and encodes one or more signals for supply to streaming server 62. In alternative embodiments, each encoder 52 may serve multiple cameras 50. In such embodiments, encoder 52 may have multiple processes running 5 to perform encoding for the multiple cameras 50 connected to the encoder 52. In some embodiments, encoder 52 may have multiple processors performing encoding for multiple cameras 50 or a single camera 50.

Many live event venues have a venue display 60. A venue display typically comprises one more large screen(s) where attendees of the event can view textual information about the event, still photos about the event, graphical information about the event, and/or video of the live event. In some instances, prerecorded video will also be displayed on venue display 60. As with other elements of the system illustrated in FIG. 2, venue display 60 may be omitted without departing from the scope of the invention. In addition, a venue may have multiple displays 60.

In this embodiment, venue display 60 allows video of a live event to be displayed to attendees of the live event. The outputs of cameras 50 are supplied to video mixing board 54. The operator of video mixing board 54 may select one or more video signals from one or more cameras 50 to be output at any particular time to venue display 60. The output signal from video mixing board 54 is provided to video distribution system 59, which may then display the video on video display 60. In some venues, the output of video mixing board 54 may be provided directly to venue display 60. In other embodiments, particularly where a venue has multiple screens upon which to display content, video distribution system may be used to provide video to multiple screens. Video distribution system may be omitted without departing from the scope of the invention.

Venue server 58 may also provide signals to video display 60. Sometimes, the video from mixing board 54 is displayed while other times the output of venue server 58 is displayed (as controlled by a venue video operator or perhaps as controlled using venue server 58 in some embodiments). In addition, the output of video mixing board 54 may be supplied to main encoder 56. Main encoder 56 is similar or identical to encoders 52. Main encoder 56 is illustrated separately in this embodiment as main encoder 56 may be used to encode the video signal that is sent to venue display 60 so that the users of wireless devices 76 may also choose to view the same video being displayed on venue display 60. Where streaming server 62 holds an ephemeral cache of the output of main encoder 56 for delayed playback, this video stream cache may later be used after the live event is over to replay all or a portion of the live event to the operators of wireless devices 76 (or other devices) In some embodiments, streaming server 62 (or other devices) may record the video, audio, or audio/video streams for later use. Such recordings may also be used to replay all or a portion of the live event to the operators of wireless devices 76 (or other devices).

In some embodiments, encoders 52 and main encoder 56 may also receive an output from the main sound board of the venue (not explicitly shown). Thus, encoders 52 and main encoder 56 may also encode audio signals that may be synchronized with the video signals received and encoded by encoders 52 and main encoder 56. As was the case with the video signals, the audio signals may be analog or digital signals without departing from the scope of the invention. Any video signals or audio signals may be digitally encoded in any acceptable digital format without departing from the scope of the invention. In some embodiments, cameras 50 may create audio signals.

Streaming server 62 may be used to stream digital video to wireless devices 76 (or other devices). Streaming server 62 may be located in a venue (or elsewhere) and may have wireless networking hardware built into it to provide the streaming of video in a wireless manner to wireless devices 76. Alternatively, streaming server 62 may be connected to a wireless network or a network that includes both wired and wireless links. Ultimately, video streamed by streaming server 62 may be provided to wireless devices 76 in a wireless fashion (or other devices in a wired or wireless fashion). Streaming server 62 may provide video from one or more cameras 50 and/or from video mixing board 54 in a digital stream to wireless devices 76 in a real-time or near real-time fashion. Alternatively, the video could be streamed on a time delayed basis.

While in this embodiment, streaming server 62 is shown as providing streamed video to wireless devices 76 using wireless communication, wireless communication is optional. In some embodiments, streaming server 62 may provide streamed digital video through a wired communications network or otherwise provide video over a wired communications link to devices capable of receiving the streamed digital video and outputting that digital video to a display.

In this embodiment, streaming server 62 provides multiple digital video streams of video signals received from encoders 52 and main encoder 56 while the live event is occurring. Depending upon the embodiment, streaming server 62 may simply provide the video in a streamed fashion without recording it. Alternatively, streaming server 62 may record some or all of the video streams it receives so as to allow future and repeated playback of those video streams.

Streaming server 62 may provide digital video streams to wireless devices 76 or other devices (not explicitly shown) using point-to-point, point-to-multipoint, peer-to-peer, multipoint-to-multipoint communications, or any combination thereof. All of these forms of communicating between streaming server 62 and wireless devices 76 (or other devices) are contemplated by the scope of the invention.

As noted above in connection with the description of encoders 52 and main 15 encoder 56, the digital video streamed by streaming server 62 may or may not include audio signals. In some cases the digital video signal will include an encoded audio signal. In other embodiments, a digital audio signal may be synchronized with the streamed digital video signal.

In some embodiments, encoders 52 and main encoder 56 will provide the audio signal to streaming server 62. In other embodiments, separate audio encoders (not explicitly shown) will provide the audio in digital form to streaming server 62.

In other embodiments, the hardware and/or software for encoders 52 and main encoder 56 may be incorporated within streaming server 62 to perform encoding of video, audio, and/or a combination of video and audio.

In some embodiments, streaming server 62 may have the capability to determine the particular video stream chosen by a particular wireless device 76 during a particular time period. In such an embodiment, streaming server 62 may capture statistics and store them in streaming server 62 and/or provide them to application server 64 concerning the viewing habits of the operators of particular wireless devices 76. For example, streaming server 62 may capture statistics on which video signal provided by a camera 50 is the most popular camera angle for viewing during a particular point in time during a live event. Thus, streaming server 62 may record the camera angle choices of operators of wireless devices 76 (or other devices). Those choices may later be synchronized by application server 64 with selected demographic information concerning the owner of a wireless device 76. In other embodiments, the application server 64 may record such statistics where the application server 64 interacts with wireless devices 76 (or other devices) to allow selection of a camera angle. The streaming server 62 may also capture other statistics typically captured by streaming servers.

These statistics may allow the operator of a live event, the performers at a live event, or others to target marketing of recordings of the live event to different demographic groups based upon aggregate preferences of particular demographic groups for a particular camera angle or media stream.

In some embodiments, streaming server 62 may have security controls built-in such that streaming server 62 controls the wireless devices 76 that are capable of receiving the output of streaming server 62. If wireless devices 76 include a GPS receiver that indicates the geographic position of the wireless device 76, then streaming server 62 or application server 64 may provide constraints as to the GPS coordinates of particular wireless devices 76 that are authorized to receive a video stream of the live event. Software and/or hardware in wireless devices 76 may prevent video streams outside the range of authorized GPS coordinates from viewing particular video streams.

Application server 64 (and/or streaming server 62) may also control which wireless devices 76 are capable of receiving video streams by requiring the operator of a wireless device 76 to input a code (such as, for example, a numeric code) from a ticket to the live event into the wireless device 76 in order to obtain authorization to receive streamed video for that live event. As another example, owners of wireless devices 76 may subscribe to services that allow them to obtain streamed video for various live events. Application server 64 (and/or streaming server 62) may retain identification numbers of such wireless devices 76. Using such identification numbers, application server 64, a wireless device 76, and/or the combination may provide security control such that only wireless devices 76 that have subscribed to a particular service are allowed to receive video of the live event from streaming server 62. (Similar control could be used for other devices besides wireless devices 76.)

Alternatively, in another embodiment, an owner of a wireless device 76 (or other user thereof) may purchase a code to input into wireless device 76 to allow wireless device 76 to receive streamed video for a particular live event. This code could be purchased at the time tickets for the live event were purchased or otherwise obtained. Alternatively, this code could be obtained at the live event venue.

In some embodiments, only attendees of the live event will be permitted to receive streamed video from streaming server 62. In other embodiments, wireless devices 76 (or other devices) remote from the venue of the live event will be permitted to receive streamed video of the live event from streaming server 62. In such embodiments, attendees of the live event, and/or remote viewers may be permitted to receive either live video, delayed video, or recorded video of the live event (and/or audio live, delayed, or recorded) depending upon the desires of the operator of the venue where the live event is occurring, the promoters of the live event, the operator of the service, and/or the performers of the live event.

The system may also include application server 64. In this embodiment, application server 64 comprises software running on a general purpose computer such as a general purpose computer 10. In other embodiments, application server 64 may be a special purpose device. While FIG. 2 illustrates application server 64 as being separate from streaming server 62, venue server 58, and application distribution server 66, all of these servers could be combined in a single physical computer, a computer with multiple processors, or run on a collection of computers without departing from the scope of the invention. Similarly, other systems, gateways, and servers illustrated in FIG. 2 could be combined with the functions of application server 64 without departing from the scope of the invention.

Application server 64 controls various functions for the system illustrated in FIG. 2. Application server 64 controls the registration of wireless devices 76 (or other devices) to allow such devices to receive video, audio, and/or audio-video from streaming server 62. In this embodiment, application server 64 gathers identification information about each wireless device 76 being registered as well as demographic information about the operator of wireless device 76. Such demographic information may include but is not limited to the name, address, telephone number, work address, work telephone number, electronic mail address, age, occupation, sex, and/or income of the operator of a wireless device 76. Other demographic information may be collected or some of the listed demographic information omitted without departing from the scope of the invention. This information may be gathered at one time or over multiple sessions on the wireless device, on another device (eg: an internet-connected PC), or on any combination of devices. Application server 64 may also gather information about the wireless device 76. Where wireless device 76 includes a wireless telephone capability, application server 64 may obtain the telephone number of the wireless device 76 during the registration process and/or may obtain some other identification code or number associated with a particular wireless device 76.

As noted above, the system of the invention can be used to stream video, audio, and/or audio-video signals. When the terms "video signal," "video stream," etc. are used in the claims, those terms are meant to broadly refer to any type of signal that includes video content including without limitation video without audio, video interleaved with audio, video synchronized with an audio signal, etc. Any of the video, audio, or audio-video signals herein could have data interleaved with them as well without departing from the scope of the invention.

Application server 64 may also maintain records concerning the wireless devices 76, and/or persons who have authority to receive video from streaming server 62 for a particular live event. In this embodiment, application server 64 stores data concerning each event in a database. Where tickets are sold for the live event, application server 64 may maintain a list of valid codes which are printed on the ticket. These codes may then be used to control access to video, audio, and/or audio-video from streaming server 62. Where a ticket is reported stolen or lost, application server 64 may be able to determine that the code associated with the stolen or lost ticket is invalid, thus preventing streaming server 62 from providing video to a person using that ticket code with a wireless device 76 in an attempt to receive the streamed video. In other embodiments, no such security will be provided. Additional security may be provided by application server 64 by monitoring access attempts and disabling access to streaming server 62 and/or application server 64 temporarily or permanently if repeated unauthorized attempts to access the system are detected.

In some embodiments, application server 64 will maintain a list of telephone numbers or other identification numbers for wireless devices 76 (or other devices) such that it can instruct streaming server 62 to allow or disallow a particular wireless device 76 from receiving video, audio, and/or audio-video from streaming server 62 for the particular live event. In other embodiments, application server 64 may maintain data concerning special access codes which are valid for a particular live event. In such an embodiment, application server 64 may interact with streaming server 62 to only allow those wireless devices 76 providing a valid authentication code to receive video, audio, and/or audio-video of the live event from streaming server 62.

In the case of an owner of a wireless device 76 (or other device) who has subscribed to receive video, audio, and/or audio-video from the service for a variety of live events, application server 64 may use the telephone number and/or other identification number, security certificate, or key for the wireless device 76 and/or user-specific authentication credentials (such as a user name and password or token or key) to control access to video from streaming server 62.

In some embodiments, an application server 64, a streaming server 62, and an application distribution server 66 may be used to serve multiple venues for multiple live events. In other embodiments, some or all of these servers could be provided one per venue or one per multiple venues. Any suitable communications link may be used to link any of the various components of the system illustrated in FIG. 2.

Application server 64 may also maintain data about particular events such as the timing of the event, the location of the event, the time zone of the event, and the performers at the event as well as the rights associated with the streams originating from the event, including but not limited to: duration of availability, maximum numbers of views/plays per member, maximum number of plays per stream, viral marketing "send to a friend" permission, maximum number of "send to a friend"s per member, and maximum number of "send to a friend"s per stream, permission to "send to a friend" who was not at the event or only to send the stream to other people who were at the event (who would be required to authenticate same using methods described elsewhere). Application server 64 may maintain a database associated with each person and/or wireless device 76 (or other device) which has registered with application server 64 to receive streamed video from streaming server 62. As noted above, this database may include demographic information about the user, information about the user's wireless device 76, as well as information concerning which events a particular user has attended or purchased the ability to receive live video for a period. Each member may also have particular preferences concerning the way in which information is provided to and from its wireless device 76 or other device, and application server 64 may retain these preferences as well.

Application server 64 may include in its database information sufficient to track usage of copyrightable content so that any required royalties (if any) may be paid for any copyright usage associated with the use of the system illustrated in FIG. 2. Application server 64 may also include data concerning the video and/or audio information being provided by streaming server 62.

As noted above, application server 64 may also obtain statistical information concerning the use of the system by various users of wireless devices 76 (or other devices). Application server 64 may track each session between wireless device 76 and application server 64 and/or streaming server 62 to determine what each user did while interacting with the system illustrated in FIG. 2.

Application server 64 may also manage the security of the system by controlling the access of wireless devices 76 (or other devices) to video and/or audio output by streaming server 62 using any of the methods described herein. Authentication by wireless device 76 will be described more particularly below in connection with a description of wireless device 76.

As noted above, application server 64 may maintain various statistics concerning various access patterns by users of wireless devices 76. Application server 64 may also maintain statistics concerning what occurred for a particular live event. Application server 64 may produce various reports containing these statistics to be used for better enhancing live events in the future. These reports may also be used to track usage patterns of particular users and/or demographic groups and/or target messages to these users.

The system illustrated in FIG. 2 may allow attendees at a live event to use a wireless device 76 (or another device) to send text messages, pictures, and/or video clips to be displayed on venue display 60. In order to prevent undesirable messages (e.g. obscene. messages or images) from appearing on venue display 60, messages from a wireless device 76 are sent to application server 64, in this embodiment through SMS/MMS gateway 68. The messages are received by application server 64. In one embodiment, application server 64 contains a list of words to be automatically deleted from messages intended to be displayed on venue display 60. This feature is optional and could be omitted without departing from the scope of the invention. After bad words have been deleted from the message in such an embodiment, the message is provided to publishing workstation 77 where a human moderator may choose to allow or disallow the content from being displayed on venue display 60 and/or may edit the content. In some embodiments, the messages may also be sent to a review workstation 75 for review an advertiser or any other person associated with the live event. The review workstation 75 may allow another person to approve or disapprove of content for display on venue display 60 (or in some cases for streaming during or after the conclusion of the live event). After review has taken place using one or both of publishing workstation 77 and/or review workstation 75, the content may be sent to application server 64 for display on venue display 60 using venue server 58. Venue server 58 may provide a video signal containing the attendee content for display. A human or automated process may control whether content provided to venue server 58 gets displayed on venue display 60.

The SMS/MMS gateway 68 may be software running on a general purpose computer such as general purpose computer 10. The functions of SMS/MMS gateway 68 may be provided by any combination of hardware and/or software without departing from the scope of the invention.

A similar service may be provided by application server 64 to wireless devices 76 (or other devices) for digital still images, video, audio, and/or audio-video taken using a wireless device 76 (or other device). Thus, the system illustrated in FIG. 2 also allows attendees of a live event to share still images, video, audio, and/or audio-video clips that the attendees themselves produced with other attendees of the concert. These pictures, video, audio, and/or audio-video clips may be provided by the wireless device 76 (or other device) through SMS/MMS gateway 68 or in the case of audio via the voice network (user calls a phone number and leaves a voicemail message which is picked up and processed by the application server) to application server 64. Application server 64 may then provide the images, video, audio, and/or audio-video clips to the publishing workstation 77 and optionally to the review workstation(s) 75 once published where a human moderator(s) may choose to allow the same to be displayed or not to be displayed on venue display 60. (or played on the venue p.a. system in the case of audio clips). Any clips or messages that are approved by the moderator are then sent by the application server to the venue server 58 for display or playback. The SMS/MMS gateway may be software running on a general purpose computer such as general purpose computer 10. The functions of SMS/MMS gateway may be provided by any combination of hardware and/or software without departing from the scope of the invention.

Application server 64 may also maintain a list of lost or stolen telephones or other wireless devices 76 where a user has reported their telephone or other wireless device 76 lost or stolen. This list may allow application server 64 to deny streaming server 62 from providing live video, audio, and/or still images of the live event to the lost or stolen wireless device 76. Alternatively, this information may allow application server 64 to control wireless device 76 such that the video or other visual content may not be displayed by the particular wireless device 76 and any audio information received is prevented from being output to a speaker of wireless device 76.

As has been discussed herein, venue display 60 may allow live video of the live event to be displayed during the live event. In addition, venue display 60 may allow prerecorded content to be displayed prior to an event, during intermissions, and/or after the event. Venue display 60 may also be used to display text messages, pictures, video and/or images provided by attendees of the live event to application server 64. Finally, venue display 60 may be used to provide announcements by the operator of the venue using venue server 58.

In this embodiment, application server 64 may send electronic mail messages to a wireless device 76 (or other device) using SMTP server 70. Such e-mails may be used to send advertising, reminders, and/or surveys to wireless devices 76 (or other devices). Wireless devices 76 may provide e-mail responses to surveys back to application server 64. The SMTP server 70 may be software running on a general purpose computer such as general purpose computer 10. The functions of SMTP server 70 may be provided by any combination of hardware and/or software without departing from the scope of the invention.

In this embodiment, application server 64 may send text and/or multimedia messages to a wireless device 76 (or other device) using the SMS/MMS gateway 10 or SMTP server 70. Such messages or e-mails may be used to send advertising, reminders, and/or surveys to wireless devices 76 (or other devices). Wireless devices 76 may provide responses to surveys or other messages back to application server 64. The SMTP server 70 may be software running on a general purpose computer such as general purpose computer 10. The functions of SMTP server 70 may be provided by any combination of hardware and/or software without departing from the scope of the invention.

Event marketing system 72, in this embodiment comprises a website and/or database that provides information about upcoming live events. Event marketing system 72 may also advertise the live video and/or audio services provided by the system illustrated in FIG. 2. In some embodiments, event marketing system 72 may also facilitate registration of a wireless device 76 user, or other device with application server 64. Event marketing system 72 may also provide information about events to application server 64 for storage in a database associated with application server 64. In this embodiment, event marketing system 72 comprises a website running on a general purpose computer, such as general purpose computer 10. Event marketing system 72 could be any combination of hardware and software without departing from the scope of the invention. Event marketing system 72 could be the same system as the ticketing system 74 without departing from the scope of the invention.

Ticketing system 74 may be a general purpose computer such as general purpose computer 10 (or a plurality of computers). Ticketing system 74 may be any combination of hardware and/or software without departing from the scope of the invention. In this embodiment, ticketing system 74 may provide information about valid ticket codes to application server 64 as tickets are purchased or in batch files before, during, or after purchases. Thus, application server 64 may maintain a database of valid codes for a particular live event as reported by ticketing system 74. In some embodiments, valid ticket codes may be linked by the application server 64 to a telephone number, a person's name, a person's address, a person's e-mail address, or other identification data associated with a person. In other embodiments, the ticket code may be linked to an identification code associated with a wireless device 76 (or other device) by the application server 64

The system illustrated in FIG. 2 also comprises application distribution server 66. In this embodiment, application distribution server 66 comprises a software application running on a general purpose computer such as a general purpose computer 10. Application distribution server 66 may be any combination of hardware and/or software without departing from the scope of the invention. In this embodiment, application distribution server 66 stores the latest version of software for a wireless device 76 (or another device) to facilitate communication with application server 64 to receive audio, video, and/or audio/video streams from streaming server 62. As noted above, still photos may also be provided and received by wireless devices 76 using software provided by application distribution server 66 in some embodiments. Application distribution server 66 may allow a wireless device 76 with an older version of the software application to update to the current version.

Although not explicitly illustrated, application server 64 may also interface with point of sale displays in retail locations to provide audio/video/image streams from the streaming server 62, provide information about upcoming events, promotions for the service, and/or any other information maintained by application server 64.

The system of FIG. 2 also includes a plurality of wireless devices 76. As noted above, the system could include a plurality of other devices which are connected to streaming server 62 using a wired connection rather than a wireless connection. A combination of wired and wireless devices and connection may also be used. In this embodiment, wireless devices 76 may be portable or unportable. In some embodiments, the wireless devices 76 will be handheld devices. Wireless devices 76 may be, for example, personal computers such as general purpose computer 10. For example, a laptop computer with a wireless link could serve as a wireless device 76. In other embodiments, wireless device 76 will be a personal digital assistant. In other embodiments, wireless device 76 will be a wireless telephone. In other embodiments, a touch screen wired system might be connected to the system in place of, or in addition to wireless device(s) 76. The system of the invention may include a mixture of such devices and a mixture of wired and wireless devices without departing from the scope of the invention.

Wireless devices 76 may comprise computer software to allow the playback of streamed digital video, audio, and/or audio/video. Such software may allow the processing of audio signals combined with the video signals (and/or streamed separately but synchronized to the video signals) and/or audio signals without video signals without departing from the scope of the invention.

Wireless devices 76 can be made operable to receive video, images, audio, and/or audio-video from streaming server 62 using a software application running on a wireless device 76. The software application may be obtained from application distribution server 66, preloaded on the device, or installed on the device by any other means in this embodiment. The software application used to interface a wireless device 76 to application server 64 may or may not include software for playing back streamed video on a display associated with wireless device 76. In some embodiments, a separate piece of software on wireless device 76 may be used to process the streamed video. In one embodiment, software used to playback the video stream from streaming server 62 may be the Windows Media Player. Alternative embodiments, including but not limited to an MPEG 4 video player may be used. However, any choice of software capable of receiving streamed digital video, images, audio, and/or audio-video and outputting it to a display associated with wireless device 76 may be used without departing from the scope of the invention.

In some embodiments, the software application on wireless device 76 to interface with application server 64 will allow registration of the wireless device 76 with application server 64 to enable wireless device 76 to receive service. In alternative embodiments, registration may be conducted though event marketing system 72, ticketing system 74 and/or the Internet and/or any combination.

In some embodiments, a software application running on wireless device 76 opens a session with application server 64 by authenticating the wireless device 76 with application server 64 in one of the manners discussed above. After authentication, the software application and wireless device 76 may present a series of options to the user of wireless device 76. One option may be to select a video stream (camera angle) for a live event. A menu of possible choices may be provided by application server 64 to the wireless device 76. After the user of wireless device 76 selects one of the options, then the wireless device 76 may receive video from a particular camera 50 through streaming server 62. In some embodiments, the user may have additional options to select periodic still pictures provided by one or more of the cameras 50. This option may also be provided through a menu. The video selection options may also allow the user to view the signal displayed on venue display 60. The specific order of steps, or the inclusion or exclusion of specific steps may be changed without departing from the scope of the invention. At some live events, the system may store various prerecorded content on streaming server 62. Examples of prerecorded content may include commentary about the performer at the live event, interviews with the performer, and/or still pictures of the performer. The user may have the option of selecting this prerecorded content using wireless device 76 as well.

At various events (such as sporting events), the user of wireless device 76 may also have the option to select a replay of the last play from one or more camera angles. In such an embodiment, the available options would be presented to the user of wireless device 76 using a menu. The user could then enter his or her selection so as to view the replay of the previous play. In some embodiments, replays of multiple plays may be available to a wireless device 76.

As noted above, wireless device 76 may establish a session with application server 64 through authentication. In some embodiments, application server 64, streaming server 62, and/or any other server may provide an authentication key to wireless device 76 to allow decoding of video, audio, and/or audio-video streams or files received from streaming server 62. In other embodiments, the authentication process will allow wireless device 76 to receive a video stream sent directly to the particular wireless device 76. In other embodiments, the authentication process will allow a received video stream to be output to the display of wireless device 76. In other embodiments, a certification or token may be provided to wireless device 76 to allow wireless device 76 to request transmission of the stream from streaming server 76. Any type of authentication may be used without departing from the scope of the invention.

During each of these actions, application server 64 communicates with wireless device 76 to facilitate interaction between a wireless device 76 and the remainder of the system of FIG. 2. In other embodiments, application server 64 could simply provide authentication information to wireless device 76 without tracking the operation of wireless device 76 for the remainder of the live event.

In some embodiments, the software application running on wireless device 76 may allow the passing of text messages, pictures, and/or video and/or audio clips created using wireless device 76 for possible display (or broadcast in the case of audio) on venue display 60. Such content may be provided through application server 64 to publishing workstation 75 where an operator decides what content to display on venue display 60.

In some embodiments, software and wireless device 76 may allow the operator of a wireless device 76 to play a game (e.g. a trivia game) with other people at the live event. This game may be played using information displayed on venue display 60.

In some embodiments, software available on wireless device 76 may interact with application server 64 to provide an event calendar of upcoming events where the video streaming service may be available to a wireless device 76. Optionally, the event calendar may be interactive allowing an operator of a wireless device 76 to sign up for live video service at a future event and/or purchase tickets.

As noted above, wireless devices 76 may optionally be equipped to receive audio streamed from streaming server 62 either as part of a video signal, as a separate signal, or as a separate signal synchronized to a video signal provided by streaming server 62. Software on wireless device 76 may provide the user the option of viewing a streamed video signal from streaming server 62 with or without an audio signal.

In some embodiments, the system will allow the owner of a wireless device 76 to view some or all of a live event after the live event has concluded. In such embodiments, streaming server 62 or another device may cache or record some or all of the live event as it is occurring. Wireless device 76 may interact with application server 64 to cause streaming server 62 to provide content from past live events to a particular wireless device 76. In some embodiments, the number of times that a wireless device 76 can review the same content may be limited. In other embodiments, a time limit after the conclusion of the live event may be provided such that after the time period has expired the operator of wireless device 76 may no longer view some or all of the content from the live event. In addition, the total number of times particular content can be viewed may be limited on a content, event, or other basis. Software on wireless device 76, application server 64, and/or streaming server 62 may also interact to control the ability of wireless device 76 to record content or export content received from streaming server 62. Thus, the system illustrated in FIG. 2 may allow protection of copyrights of performers at live events.

In some embodiments, software and wireless device 76 may also interact with application server 64 to share content from a particular live event with a friend. In such an embodiment, wireless device 76 may provide information to application server 64 about a friend with whom the operator of wireless device 76 desires to share content. Application server 64 may then provide such content to the friend using streaming server 62 to provide the content to the friend's wireless device 76 (or other device). Application server 64 may control the number of friends to which a particular wireless device can share content and/or limit the number of times certain content may be viewed by friends of the operator of a wireless device 76. In addition, the time period during which a friend may be allowed to view content provided by streaming server 62 may be controlled using application server 64.

In addition, the total number of times particular content can be provided to or viewed by friends in aggregate may be limited on content, event, or other basis.

In some embodiments, a software application received from application distribution server 66 and running on a wireless device 76 may also provide a help feature to provide instructions as to how to use various features of the system and/or contact the operator of the system with questions, feedback or other unidirectional or bidirectional communication.

In some embodiments application server 64 and streaming server 62 in conjunction with various wireless devices 76 may limit the ability of a wireless or wired device outside the venue in which the live event is occurring from receiving video and/or audio provided by streaming server 62. In other embodiments, the system illustrated in FIG. 2 may allow wireless devices 76 (or other devices, wired or wireless) remote from the venue in which the live event is occurring to receive video and/or audio or other content from streaming server 62 while the event is occurring. In such embodiments, remote wireless devices 76 (or other devices) could receive the content on a near real-time basis, or on a delayed basis.

In operation, a plurality of cameras 50 capture video during a live event and provide video signals to encoders 52 and to video mixing board 54. Video mixing board 54, in turn, provides a video signal to main encoder 56. Video signals from encoders 52 and main encoder 56 are provided to streaming server 62 and meta data describing the encoded media may be provided to application server 64. At various times during the event, video from one or more of the cameras 50 may be provided to an optional venue display 60 under control of venue server 58. In some embodiments information and content may be provided by application server 54 to publishing workstation(s) 77 and/or review workstation(s) 75 prior to being made available to members.

During the event, one or more wireless devices 76 (or other devices) may receive video, audio, audio/video, and or still pictures streamed from streaming server 62. In some embodiments, wireless devices 76 may be authenticated using application server 64 to allow the wireless device 76 either to receive, decode, and/or display content received from streaming server 62. The invention may allow attendees at a live event to select from one of a plurality of camera views to view on a wireless device 76 and/or another device capable of receiving a video signal.

Application server 64 may communicate with wireless devices 76 in various manners such as through application distribution server 66, SMS/MMS gateway 68, and/or SMTP server 70 as described above and/or via TCP/IP or other network protocol in an n-tiered client/server configuration.

FIG. 3 illustrates a flowchart describing the operation of an example wireless device 76 in accordance with the present invention. In step 90, the wireless device 76 and/or the user operating wireless device 76 is authenticated using application server 64. Application server 64 then communicates sufficient information to wireless device 76 (e.g. to a client software application) and/or streaming server 62 to allow the particular wireless device 76 to receive content from streaming server 62.

In step 92, a menu choice is provided to the user. FIG. 3 illustrates many menu choices. Other menu choices may be provided or some of the menu choices illustrated in FIG. 3 omitted without departing from the scope of the invention.

If a replay option is selected then in step 94 various options for replay are displayed on wireless device 76 and input is received from the user as to which replay option to select. Replay options may include the camera angle, line cut, and/or the particular play to receive a replay of if the event is a sporting event. In step 96, the selected option is executed, the relevant content received from streaming server 62 and also displayed on a display of wireless device 76.

If the live option was chosen in step 92 then options for live viewing are displayed in step 98 and input is received from the user as to the display option preferred. Display options may include various camera angles as provided by one or more of the plurality of cameras 50, the option to receive video and/or still photos, the option to receive audio along with, or without, the video, a combination of the foregoing, and/or any other relevant option. In step 100, the selected option may be executed such that video (or still photos) are displayed on the display or audio is played from the device's speaker or headset or external speaker(s). After a particular selection has been made, some input may be required in step 112 to cause the menu choices to be displayed and a new choice to be made once again in step 92 or the user may be able to switch to another choice by selecting that choice using an input device, such as by pressing numbers on a telephone's keypad, thus interrupting the current view and causing the application to switch views.

If the user chooses the events option in step 92 then an event calendar is displayed in step 102. Optionally, if the particular embodiment allows signing up for a service, purchasing tickets, and/or any other options associated with a future event, then after the event calendar is displayed in step 102 these options would be presented to the user.

In step 92, if the user chose to change his or her preferences, then a menu of preferences would be displayed in step 104. Also in step 104, the user could enter his or her preferences and those preferences would then be adjusted in step 106. The adjustment of preferences may include providing information to application server 64 that are used as default preferences during future interactions between a wireless device 76 (e.g. through a client application) and application server 64.

If in step 92 a content to screen option was selected, then user content is received in step 108. As noted above, such content may include text, still photos, video, audio, and/or audio-video clips created using wireless device 76. In step 110, the relevant content is sent to application server 64 using, for example, SMS/MMS gateway 68. Application server 64 may then send the content to publishing workstation 77 for display under control of the venue display operator on venue display 60 or to the streaming server 62 for display on other wireless devices 76.

In some embodiments, user content may be sent to application server 64 by other means. For example, the user may capture or create the content and then send the content to the application server 64 using a destination address such as a short code or email address.

Although the present inventions have been described in detail, it should be understood that various changes, substitutions and alterations can be made hereto without departing from the sphere and scope of the invention as defined by the appended claims.

To aid the Patent Office, and any readers of any patent issued on this application in interpreting the claims appended hereto, Applicant wishes to note that he does not intend any of the appended claims to invoke ¶6 of 35 U.S.C. §112 as it exists on the date of filing hereof unless "means for" or "step for" are used in the particular claim.

The invention claimed is:

1. A method of providing still images of live events, the method comprising:
   accessing, while a live event is occurring, a plurality of video signals of the live event, each video signal in the plurality of video signals corresponding to a view in a plurality of views of the live event;
   extracting, from at least two video signals in the plurality of video signals, a frame from the video signal;
   generating a plurality of still images of the live event, each still image in the plurality of still images corresponding to one of the extracted frames;
   availing, while the live event is occurring, the plurality of still images to each of a plurality of viewers of the live event;
   wherein each of the plurality of viewers is enabled to select, using a device of the viewer, which of the plurality of still images to view while the live event is occurring;
   receiving, from a device of each viewer of the plurality of viewers, a communication corresponding to a selection of one or the plurality of still images; and
   generating a statistic based on the received communications that is indicative of a popularity of a view in the plurality of views.

2. The method of claim 1, wherein the plurality of viewers includes an attendee viewing the live event from within a venue of the live event.

3. The method of claim 1, wherein the plurality of viewers includes a viewer remotely viewing the live event from outside a venue of the live event.

4. The method of claim 1, the method further comprising:
   identifying one of the plurality of video signals corresponding to a view that matches a view of the selected still image; and
   causing the one of the plurality of video signals to be transmitted the device of the viewer.

5. The method of claim 1, wherein the accessing the plurality of video signals of the live event comprises receiving a video signal of the plurality of video signals from a camera in a venue of the live event.

6. The method of claim 1, the method further comprising:
   identifying a set of demographic groups;
   for each demographic group in the set of demographic groups:

identifying a set of viewers from the plurality of viewers having a demographic characteristic matching a demographic characteristic of the demographic group; and identifying a variable indicative of view-point preference based on the selection.

7. The method of claim 1, wherein at least two views in the plurality of views differ in a degree of zoom.

8. The method of claim 1, wherein the availing the plurality of still images includes sequentially providing each of the plurality of still images.

9. The method of claim 1, wherein the availing the plurality of still includes sending the plurality of still images to the devices of the plurality of viewers via an app installed on each of the devices of the plurality of viewers.

10. A system, comprising:
one or more data processors; and
a non-transitory computer readable storage medium containing instructions which, when executed on the one or more data processors, cause the one or more data processors to perform actions including:
   accessing, while a live event is occurring, a plurality of video signals of the live event, each video signal in the plurality of video signals corresponding to a view in a plurality of views of the live event;
   extracting, from at least two video signals in the plurality of video signals, a frame from the video signal;
   generating a plurality of still images of the live event, each still image in the plurality of still images corresponding to one of the extracted frames;
   availing, while the live event is occurring, the plurality of still images to each of a plurality of viewers of the live event;
   wherein each of the plurality of viewers is enabled to select, using a device of the viewer, which of the plurality of still images to view while the live event is occurring;
   receiving, from a device of each viewer of the plurality of viewers, a communication corresponding to a selection of one or the plurality of still images; and
   generating a statistic based on the received communications that is indicative of a popularity of a view in the plurality of views.

11. The system of claim 10, wherein the plurality of viewers includes an attendee viewing the live event from within a venue of the live event.

12. The system of claim 10, wherein the plurality of viewers includes a viewer remotely viewing the live event from outside a venue of the live event.

13. The system of claim 10, the actions further comprising:
identifying one of the plurality of video signals corresponding to a view that matches a view of the selected still image; and
causing the one of the plurality of video signals to be transmitted the device of the viewer.

14. The system of claim 10, wherein the accessing the plurality of video signals of the live event comprises receiving a video signal of the plurality of video signals from a camera in a venue of the live event.

15. The system of claim 10, the actions further comprising:
identifying a set of demographic groups;
for each demographic group in the set of demographic groups:
   identifying a set of viewers from the plurality of viewers having a demographic characteristic matching a demographic characteristic of the demographic group; and
   identifying a variable indicative of view-point preference.

16. The system of claim 10, wherein at least two views in the plurality of views differ in a degree of zoom.

17. A computer-program product tangibly embodied in a non-transitory machine-readable storage medium, the product including instructions configured to cause one or more data processors to perform actions including:
   accessing, while a live event is occurring, a plurality of video signals of the live event, each video signal in the plurality of video signals corresponding to a view in a plurality of views of the live event;
   extracting, from at least two video signals in the plurality of video signals, a frame from the video signal;
   generating a plurality of still images of the live event, each still image in the plurality of still images corresponding to one of the extracted frames;
   availing, while the live event is occurring, the plurality of still images to each of a plurality of viewers of the live event;
   wherein each of the plurality of viewers is enabled to select, using a device of the viewer, which of the plurality of still images to view while the live event is occurring;
   receiving, from a device of each viewer of the plurality of viewers, a communication corresponding to a selection of one or the plurality of still images; and
   generating a statistic based on the received communications that is indicative of a popularity of a view in the plurality of views.

18. The computer-program product of claim 17, the actions further comprising:
identifying one of the plurality of video signals corresponding to a view that matches a view of the selected still image; and
causing the one of the plurality of video signals to be transmitted the device of the viewer.

* * * * *